United States Patent Office 3,291,797
Patented Dec. 13, 1966

3,291,797
3,4-DIHYDRO-2H-PYRAN-2-YLMETHYL PTERIDINE DERIVATIVES
Thomas S. Osdene, Richmond, Va., and Lee E. McCardle, West Chester, Pa., assignors to American Home Products Corporation, New York, N.Y., a corporation of Delaware
No Drawing. Filed Oct. 23, 1965, Ser. No. 504,238
12 Claims. (Cl. 260—251.5)

This invention relates to novel products obtained by reacting a 4,6-diamino-5-nitrosopyrimidine with a N,N'-bis(3,4-dihydro-2H-pyran-2-ylmethyl)malonamide or with a 2-cyano-N-(3,4-dihydro-2H-pyran - 2 - ylmethyl)acetamide.

As determined by standard pharmacological procedures, the claimed compounds exhibit analgesic and central nervous system activity.

The claimed compounds and their preparation are illustrated in the following reaction scheme:

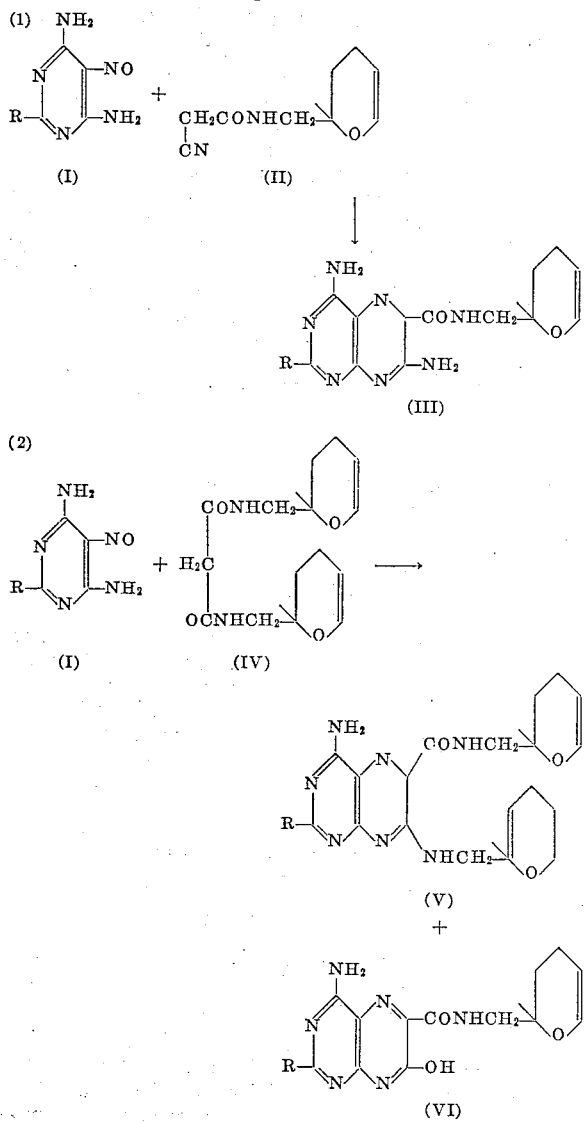

where R is alkyl, phenyl, phenyl substituted in any position with lower alkyl, lower alkoxy, halogen, trifluoromethyl and thienyl.

As shown above, the claimed compounds are prepared by condensing a 4,6-diamino-5-nitrosopyrimidine (I), disclosed, for example, in British Patent 894,384, with either a N,N'-bis(3,4-dihydro-2H-pyran-2-ylmethyl)malonamide (II) or a 2-cyano-N-(3,4-dihydro-2H-pyran-2-ylmethyl)-acetamide (IV), prepared as in Examples 1 and 2 herein.

In the case of the synthesis involving the malonamide, this starting material and the 5-nitroso-pyrimidine are mixed in absolute ethanol containing an equivalent amount of a basic catalyst such as sodium, sodium alkoxide and the like and refluxed with stirring. The solution is cooled and evaporated to dryness. The residue is treated with water and the insoluble material is filtered off to give the 4-amino-7-(3,4-dihydro-2H-pyran)-2-ylmethylamino-N-(3,4-dihydro-2H-pyran-2-ylmethyl) - 6 - pteridinecarboxamide (V). The filtrate from the above water treatment can be acidified to give a precipitate which is the corresponding 7-hydroxy compound (VI).

The 7-amino compound (III) is prepared as above described but using the 2-cyano-N-(3,4-dihydro-2H-pyran-2-ylmethyl)acetamide starting material (II).

The following examples serve to illustrate but not to limit the invention; all temperatures given being in degrees centigrade:

EXAMPLE I

*Preparation of N,N'-bis(3,4-dihydro-2H-pyran-2-ylmethyl)malonamide*

A mixture of 56.5 g. of 2-aminomethyl-3,4-dihydro-2H-pyran and 40.0 g. of diethyl malonate was boiled under reflux for 4 hours. The ethanol formed during the reaction was removed on the rotary evaporator and the residual oil was treated with ether. On standing a white material was deposited and was removed by filtration. Recrystallization from ethyl acetate afforded N,N-bis-(3,4-dihydro-2H-pyran - 2 - ylmethyl)malonamide, M.P. 100°.

*Analysis.*—Calc. C, 61.20; H, 7.53; N, 9.52. Found: C, 61.09; H, 7.52; N, 9.59.

EXAMPLE II

*Preparation of 2-cyano-N-(3,4-dihydro-2H-pyran-2-ylmethyl)acetamide*

A mixture of 11.3 g. of ethyl cyanoacetate and 11.3 g. of 2-aminomethyl-3,4-dihydro-2H-pyran was boiled under reflux for 3 hours. The ethanol formed during the reaction was removed on a rotary evaporator and the residue solidified on cooling, wt. 16 g., M.P. 55°.

This material was used without further purification in the pteridine synthesis.

EXAMPLE III

*Preparation of 4,7-diamino-N-(3,4-dihydro-2H-pyran-2-ylmethyl)-2-phenyl-6-pteridinecarboxamide*

To a solution of 0.2 g. of sodium in 250 ml. of absolute ethanol was added 4.3 g. of 4,6-diamino-5-nitroso-2-phenyl-pyrimidine and 4.0 g. of 2-cyano-N-(3,4-dihydro-2H-pyran-2-ylmethyl)acetamide and the mixture was stirred and boiled under reflux for 15 minutes. The yellow precipitate which had formed was removed after cooling, and recrystallization from aqueous 2-ethoxyethanol gave 4,7-diamino-N-(3,4-dihydro-2H-pyran-2-ylmethyl)-2-phenyl-6-pteridinecarboxamide, M.P. 303°.

*Analysis.*—Calc.: C, 60.47; H, 5.08; N, 25.98. Found: C, 60.64; H, 5.11; N, 25.83.

EXAMPLE IV

*Preparation of 4-amino-7-(3,4-dihydro-2H-pyran-2-ylmethylamino)-N-(3,4 - dihydro-2H-pyran-2-ylmethyl)-2-phenyl-6-pteridinecarboxamide*

To a solution of 0.25 g. of sodium in 500 ml. of absolute ethanol was added 2.15 g. of 4,6-diamino-5-nitroso- 2-phenylpyrimidine and 3.2 g. of N,N'-bis(3,4-dihydro-2H-pyran-2-yl)malonamide and the mixture was stirred and boiled under reflux for 30 mins. After cooling, the solution was evaporated to dryness on a rotary evaporator and the residue was treated with water. The insoluble material was removed by filtration and recrystallization from ethanol afforded 4-amino-7(3,4-dihydro-2H-pyran-2 - ylmethylamino)-N-(3,4 - dihydro-2H-pyran-2-ylmethyl)-2-phenyl-6-pteridinecarboxamide, M.P. 247°.

*Analysis.*—Calc.: C, 63.41; H, 5.75; N, 20.71. C, 63.13; H, 5.62; N, 20.75.

EXAMPLE V

*Preparation of 4,7-diamino-N-(3,4-dihydro-2H-pyran-2-ylmethyl)-2-(2-thienyl)-6-pteridinecarboxamide*

To a solution of 0.2 g. of sodium in 250 ml. of absolute ethanol was added 4.4 g. of 4,6-diamino-5-nitroso-2-(2-thienyl)pyrimidine and 4.0 g. of 2-cyano-N-(3,4-dihydro-2H-pyran-2-ylmethyl)acetamide, and the mixture was stirred and boiled under reflux for 30 mins. A yellow precipitate resulted which was removed by filtration and on recrystallization from aqueous 2-ethoxyethanol afforded 4,7-diamino-N-(3,4-dihydro-2H-pyran-2-ylmethyl)-2-(2-thienyl)-6-pteridinecarboxamide, M.P. 305°.

*Analysis.*—Calc.: C, 53.25; H, 4.45; N, 25.57; S, 8.36. C, 53.47; H, 4.63; N, 25.41; S, 8.4.

EXAMPLE VI

*Preparation of 4,7-diamino-2-(p-chlorophenyl)-N-(3,4-dihydro-2H-pyran-2-ylmethyl)-6-pteridinecarboxamide*

To a solution of 0.2 g. of sodium in 250 ml. of absolute ethanol was added 5.0 g. of 4,6-diamino-2-(p-chlorophenyl)-5-nitrosopyrimidine and 4.0 g. of 2-cyano-N-(3,4-dihydro-2H-pyran-2-ylmethyl)acetamide and the mixture was boiled under reflux with stirring for 30 mins. A bright yellow precipitate resulted which was removed by filtration and recrystallization from aqueous 2-ethoxy ethanol afforded 4,7-diamino-2-(p-chlorophenyl)-N-(3,4-dihydro - 2H-pyran-2-ylmethyl)-6-pteridinecarboxamide, M.P. 327°.

*Analysis.*—Calc.: C, 55.41; H, 4.41; N, 23.81; Cl, 8.61. Found: C, 55.12; H, 4.18; N, 23.66; Cl, 8.6.

EXAMPLE VII

*Preparation of 4,7-diamino-N-(3,4-dihydo-2H-pyran-2-ylmethyl)-2-n-propyl-6-pteridinecarboxamide*

To a solution of 0.1 g. of sodium in 150 ml. of absolute ethanol was added 0.90 g. of 4,6-diamino-5-nitroso-2-n-propyl-pyrimidine and 0.99 g. of 2-cyano-N-(3,4-dihydro-2H-pyran-2-ylmethyl)acetamide and the mixture was stirred and boiled under reflux for 30 mins. The amber solution which was formed was evaporated to dryness. The yellow material which was formed was treated with 20 ml. water. The yellow material was removed from the water and recrystallization from absolute ethanol gave 4,7-diamino-N-(3,4-dihydro-2H-pyran-2-ylmethyl)-2-(n-propyl)-6-pteridinecarboxamide, M.P. 278°.

EXAMPLE VIII

*Preparation of 4-amino-7-(3,4-dihydro - 2H - pyran-2-yl-methylamino)-N-(3,4 - dihydro-2H-pyran-2-ylmethyl)-2-(o-tolyl)-6-pteridinecarboxamide*

To a solution of 0.5 g. sodium in 300 ml. absolute ethanol was added 4.6 g. of 4,6-diamino-5-nitroso-2-(o-tolyl)pyrimidine and 6.5 g. of N,N'-bis(3,4-dihydro-2H-pyran-2-yl)malonamide and the mixture was stirred and boiled under reflux for 30 mins. The resulting solution was evaporated to dryness on a rotary evaportor and the residue was treated with 200 ml. water. The insoluble material was removed by filtration and recrystallization from aqueous methanol afforded 4-amino-7-(3,4-dihydro-2H-pyran-2-ylmethylamino) - N - (3,4-dihydro-2H-pyran-2-ylmethyl)-2-(o-tolyl) - 6 - pteridinecarboxamide, M.P. 203°.

*Analysis.*—Calc.: C, 64.05; H, 6.00; N, 20.11. Found: C, 63.85; H, 6.15; N, 20.14.

EXAMPLE IX

*Preparation of 4-amino-N-(3,4-dihydro - 2H - pyran-2-yl-methyl)-7-hydroxy-2-(o-tolyl)-6-pteridinecarboxamide*

To a solution of 0.5 g. sodium in 300 ml. absolute ethanol was added 4.6 g. of 4,6-diamino-5-nitroso-2-(o-tolyl)pyrimidine followed by 6.5 g. of N,N'-bis(3,4-dihydro-2H-pyran-2-yl)malonamide and the mixture was boiled under reflux with stirring for 30 mins. The resulting solution was evaporated to dryness on a rotary evaporator and the residue was treated with 200 ml. water. The insoluble material was removed by filtration and the filtrate was acidified with 3 N acetic acid when a yellow precipitate was obtained. After removal by filtration the material was recrystallized from 2-ethoxyethanol to afford 4-amino-N-(3,4 - dihydro - 2H - pyran-2-ylmethyl)-7-hydroxy-2-(o-tolyl)-6-pteridinecarboxamide, M.P. 263°.

*Analysis.*—Calc.: C, 61.21; H, 5.14; N, 21.42. Found: C, 61.49; H, 5.28; N, 21.09.

EXAMPLE X

*Preparation of 4-amino-7-(3,4-dihydro - 2H - pyran-2-yl-methylamino)-N-(3,4 - dihydro-2H-pyran-2-ylmethyl)-2-(2-thienyl)-6pteridinecarboxamide*

To a solution of 0.5 g. sodium in 300 ml. absolute ethanol was added 4.4 g. 4,6-diamino-5-nitroso-2-(2-thienyl)pyrimidine and 6.5 g. N,N'-bis(3,4-dihydro-2H-pyran-2-yl)malonamide and the mixture was stirred and boiled under reflux for 30 mins. The resulting solution was evaporated down to dryness on a rotary evaporator and the residue was treated with 200 ml. of water. The insoluble material was removed by filtration and recrystallization from 2-ethoxyethanol and water afforded 4-amino-7-(3,4-dihydro - 2H - pyran-2-ylmethylamino)-N-(3,4-dihydro - 2H - pyran-2-ylmethyl)-2-(2-thienyl)-6-pteridinecarboxamide, M.P. 258°.

*Analysis.*—Calc.: C, 57.60; H, 5.26; N, 20.45; S, 6.69. Found: C, 57.43; H, 5.29; N, 20.11; S. 7.0.

EXAMPLE XI

*Preparation of 4-amino-N-(3,4-dihydro - 2H - pyran-2-yl-methyl)-7-hydroxy-2-(2-thienyl)-6-pteridinecarboxamide*

To a solution of 0.5 g. of sodium in 300 ml. of absolute ethanol was added 4.4 g. of 4,6-diamino-5-nitroso-2-(2-thienyl)pyrimidine followed by 6.5 g. of N,N'-bis(3, 4-dihydro-2H-pyran-2-yl)malonamide and the mixture was boiled under reflux with stirring for 30 mins. The resulting solution was evaporated to dryness on a rotary evaporator and the residue was treated with 200 ml. of water. The insoluble material was removed by filtration and the filtrate was acidified with 3 N acetic acid when a yellow precipitate was obtained. After removal by filtration the material recrystallized from 3-ethoxyethanol to afford 4-amino-N-(3,4-dihydro-2H-pyran-2-ylmethyl)-7-hydroxy-2-(2-thienyl) - 6 - pteridinecarboxamide, M.P. 292°.

*Analysis.*—Calc.: C, 53.11; H, 4.20; N, 21.86; S, 8.34. Found: C, 53.02; H, 4.34; N, 21.75; S, 8.5.

EXAMPLE XII

*Preperation of 4-amino-7-(3,4-dihydro - 2H - pyran-2-yl-methylamino)-N-(3,4 - dihydro-2H-pyran-2-ylmethyl)-2-($\alpha,\alpha,\alpha$-trifluoro-m-tolyl)-6-pteridinecarboxamide*

To a solution of 0.5 g. sodium in 300 ml. of absolute ethanol was added 5.6 g. of 4,6-diamino-5-nitroso-2-($\alpha,\alpha,\alpha$-trifluoro-m-tolyl)pyrimidine and 6.5 g. of N,N'-bis(3,4-dihydro-2H-pyran-2-yl)malonamide and the mixture was stirred and boiled under reflux for 30 mins. The resulting solution was evaporated down to dryness on a rotary evaporator and the residue was treated with 200 ml. of water. The insoluble material was removed by filtration and recrystallization from absolute ethanol afforded 4-amino-7-(3,4-dihydro - 2H - pyran-2-ylmethylamino) - N - (3,4-dihydro-2H-pyran-2-ylmethyl)-2-(α,α,α-trifluoro-m-tolyl)-6-pteridinecarboxamide, M.P. 205°.

*Analysis.*—Calc.: C, 57.66; H, 4.85; N, 18.11; F, 10.53. Found: C, 57.87; H, 5.10; N, 18.10; F, 10.1.

EXAMPLE XIII

*Preparation of 4-amino-N-(3,4-dihydro - 2H - pyran-2-ylmethyl) - 7 - hydroxy - 2 - (α,α,α-trifluoro-m-tolyl)-6-pteridinecarboxamide*

To a solution of 0.5 g. of sodium in 300 ml. of absolute ethanol was added 5.6 g. of 4,6-diamino-5-nitroso-2-(α,α,α-trifluoro-m-tolyl)pyrimidine and 6.5 g. of N,N'-bis(3,4-dihydro-2H-pyran-2-yl)malonamide and the mixture was stirred and boiled under reflux for 30 mins. The resulting solution was evaporated down to dryness on a rotary evaporator and the residue was treated with 200 ml. of water. The insoluble material was removed by filtration and the filtrate was acidified with 3 N acetic acid when a yellow precipitate was obtained. After removal by filtration the material was recrystallized from 2-ethoxyethanol to afford 4-amino-N-(-3,4-dihydro-2H-pyran-2-ylmethyl)-7-hydroxy-2-(α,α,α - trifluoro-m-tolyl)-6-pteridinecarboxamide, M.P. 291°.

*Analysis.*—Calc.: C, 53.81; H, 3.84; N, 18.83; F, 12.77. Found: C, 53.64; H, 4.07; N, 18.53; F, 11.9.

When the compounds of the invention are employed as analgesics and/or central nervous system depressants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing standard excipients, or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 100 mg. to about 400 mg. per kg. of body weight per day, although as aforementioned variations will occur. However, a dosage level that is in the range of from about 200 mg. to about 300 mg. per kg. of body weight per day is most desirably employed in order to achieve effective results.

What is claimed:

1. A compound of the formula:

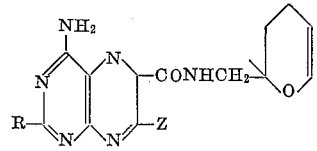

wherein R is 2-thienyl, lower alkyl, phenyl, halophenyl, trifluoromethyl, phenyl, or (lower)alkylphenyl; Z is hydroxy, amino or 3,4-dihydro-2H-pyran-2-ylmethylamino.

2. 4,7 - diamino-N-(3,4-dihydro-2H-pyran-2-ylmethyl)-2-phenyl-6-pteridinecarboxamide.

3. 4-amino-7-(3,4 - dihydro - 2H - pyran - 2 - ylmethylamino) - N - 3,4 - dihydro - 2H - pyran - 2 - ylmethyl) - 2-phenyl-6-pteridinecarboxamide.

4. 4,7 - diamino-N-(3,4-dihydro-2H-pyran-2-ylmethyl)-2-(2-thienyl)-6-pteridinecarboxamide.

5. 4,7-diamino-2-(p-chlorophenyl) - N - (3,4 - dihydro-2H-pyran-2-ylmethyl)-6-pteridinecarboxamide.

6. 4,7 - diamino-N-(3,4-dihydro-2H-pyran-2-ylmethyl)-2-n-propyl-6-pteridinecarboxamide.

7. 4-amino-7-(3,4-dihydro-2H-pyran-2-ylmethylamino)-N-(3,4-dihydro - 2H - pyran - 2 - ylmethyl)-2-(o-tolyl)-6-pteridinecarboxamide.

8. 4-amino-N-(3,4 - dihydro - 2H - pyran-2-ylmethyl)-7-hydroxy-2-(o-tolyl)-6-pteridinecarboxamide.

9. 4-amino-7-(3,4-dihydro-2H-pyran-2-ylmethylamino)-N-(3,4-dihydro - 2H - pyran-2-ylmethyl)-2-(2-thienyl)-6-pteridinecarboxamide.

10. 4-amino-N-(3,4-dihydro - 2H - pyran-2-ylmethyl)-7-hydroxy-2-(2-thienyl)-6-pteridinecarboxamide.

11. 4-amino-7-(3,4 - dihydro - 2H - pyran-2-ylmethylamino) - N - (3,4-dihydro-2H-pyran-2-ylmethyl)-2-(α,α,α-trifluoro-m-tolyl)-6-pteridinecarboxamide.

12. 4-amino-N-(3,4-dihydro - 2H - pyran-2-ylmethyl) 7-hydroxy-2-(α,α,α - trifluoro-m-tolyl)-6-pteridinecarboxamide.

No references cited.

NICHOLAS S. RIZZO, *Primary Examiner.*